(12) United States Patent
Nagai

(10) Patent No.: US 6,686,032 B1
(45) Date of Patent: Feb. 3, 2004

(54) LAMINATED GLASS

(75) Inventor: Kuniko Nagai, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/831,359
(22) PCT Filed: Sep. 13, 2000
(86) PCT No.: PCT/JP00/06285
§ 371 (c)(1), (2), (4) Date: Jun. 6, 2001
(87) PCT Pub. No.: WO01/19748
PCT Pub. Date: Mar. 22, 2001

(30) Foreign Application Priority Data

Sep. 14, 1999 (JP) .......................... 11-260728

(51) Int. Cl.[7] .................. B32B 7/02; B32B 17/10; C03C 27/12; E06B 3/66
(52) U.S. Cl. .............. 428/215; 428/212; 428/213; 428/214; 428/328; 428/436; 428/437
(58) Field of Search ................ 428/328, 436, 428/437, 212, 213, 215, 214

(56) References Cited

U.S. PATENT DOCUMENTS

| | | | |
|---|---|---|---|
| 5,077,133 A | 12/1991 | Cheng | 428/426 |
| 5,518,810 A | 5/1996 | Nishihara et al. | 428/328 |
| 5,830,568 A | 11/1998 | Kondo | 428/328 |

FOREIGN PATENT DOCUMENTS

| | | |
|---|---|---|
| EP | 0 297 404 | 1/1989 |
| EP | 0 488 110 | 6/1992 |
| EP | 0 565 835 | 10/1993 |
| EP | 0 727 306 | 8/1996 |
| EP | 0 979 804 | 2/2000 |
| JP | 2-111644 | 4/1990 |
| JP | 8-217908 | 8/1996 |
| JP | 10-297945 | 11/1998 |
| WO | WO 01/42158 | 6/2001 |
| WO | WO 01/44132 | 6/2001 |

OTHER PUBLICATIONS

Yamane, et al., Asakura Shoten, Nessen Kyushu Glass, pp. 442–443, "Glass Kougaku Handbook", Jul. 5, 1999.

*Primary Examiner*—D. S. Nakarani
(74) *Attorney, Agent, or Firm*—Oblon, Spivak, McClelland, Maier & Neustadt, P.C.

(57) ABSTRACT

A laminated glass with a good appearance and heat shielding properties which comprises glass sheets 11a and 11b characterized by a UV transmittance as stipulated in ISO-9050 of at most 30%, a visible light transmittance of at least 70% under a standard light source A, a dominant wavelength of from 480 to 570 nm and an excitation purity of at most 6% at the actual thickness and an interlayer 12 interposed between the glass sheets, wherein the interlayer has heat shielding fine particles with particle diameters of at most 0.2 $\mu$m dispersed therein.

17 Claims, 2 Drawing Sheets

LAMINATED GLASS

TECHNICAL FIELD

The present invention relates to laminated glass having heat shielding properties (hereinafter referred to as IR cutoff properties).

BACKGROUND ART

Vehicles mount heat shielding windowpanes in order to intercept incident solar energy into the compartment and decrease the temperature rise in the compartment and the load on the air conditioner. As heat shielding windowpanes, thin film-deposited glass sheets having thin films of various metals and metal oxides layered on the glass surfaces may be mentioned. Because of the electrical conductivity of films of these various metals and metal oxides, thin film-deposited glass sheets intercept radio waves.

On the other hand, as windowpanes for vehicles, especially for automobiles, glass sheets having the functions of radio, TV and GPS antennas are often used. Automobiles equipped with various functional systems (such as the electric road pricing system and the keyless entry system) including sensors installed inside them to send out or receive radio waves are also proposed. In order to secure the normal function as an antenna and normal operations of various systems, windowpanes have to transmit radio waves.

Therefore, thin film-deposited glass sheets need special tuning to secure the function as an antenna. Further, thin film-deposited glass sheets can hardly be used directly for systems that require transmission of electric waves for radio communication between inside and outside vehicles.

From this viewpoint, a laminated glass that transmits radio waves as well as intercepts heat radiation is disclosed in JP-A-8-259279. The laminated glass disclosed therein uses an interlayer in which functional fine particles with particle diameters of at most 0.2 μm are dispersed. The laminated glass is supposed to not only intercept heat radiation but also suppress radio interference.

However, this laminated glass has an unfavorable appearance due to the functional fine particles dispersed in the interlayer. In other words, incorporation of as many fine particles as necessary for satisfactory IR cutoff properties for windowpanes of automobiles results in an interlayer having a high haze and hence a laminated glass having a high haze.

The object of the present invention is to provide a laminated glass with a less unfavorable appearance and IR cutoff properties which has not been known so far in order to solve the above-mentioned problems of the prior art.

DISCLOSURE OF THE INVENTION

The present invention has been accomplished to solve the above-mentioned problems and provides a laminated glass comprising plural glass sheets and an interlayer interposed between the plural glass sheets, wherein the interlayer has heat shielding fine particles with particle diameters of at most 0.2 μm dispersed therein, and at least one of the plural glass sheets is characterized by a UV transmittance as stipulated in ISO-9050 of at most 30%, a visible light transmittance of at least 70% under a standard light source A, a dominant wavelength of from 480 to 570 nm and an excitation purity of at most 6% at the actual thickness.

BEST MODE FOR CARRYING OUT THE INVENTION

Figure 1:
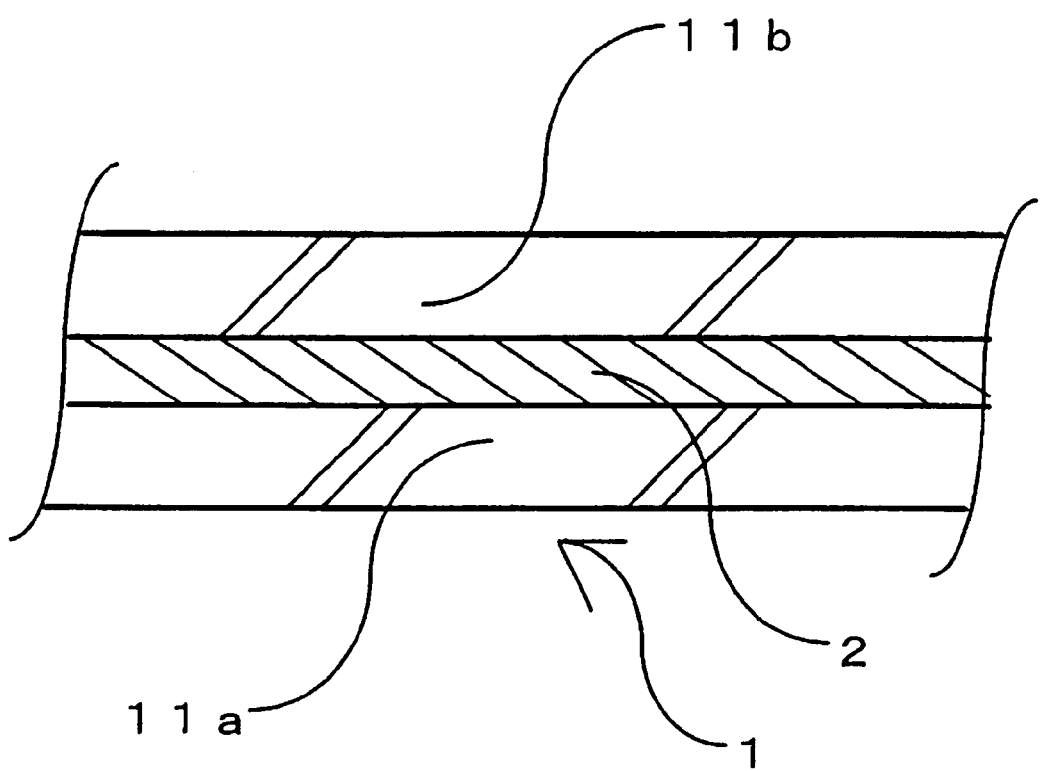
FIG. 1 is a schematic sectional view of one embodiment of the laminated glass of the present invention.

Now, the present invention will be described in further detail by referring to Drawings. FIG. 1 is a schematic sectional view of one embodiment of the laminated glass of the present invention. The laminated glass 1 is a laminate comprising two glass sheets 11a and 11b and an interlayer 2 interposed therebetween.

The interlayer 2 is a polyvinylbutyral film or a ethylene-vinyl acetate copolymer film commonly used as the interlayer of a laminated glass. In the interlayer 2, heat shielding fine particles (hereinafter referred to as IR cutoff fine particles) with particle diameters of at most 0.2 μm are dispersed. It is preferred to disperse IR cutoff fine particles with particle diameters of from 0.15 to 0.001 μm.

The IR cutoff fine particles may be, for example, fine particles made of a metal, an oxide, a nitride or a sulfide of Sn, Ti, Si, Zn, Zr, Fe, Al, Cr, Co, In, Ni, Ag, Cu, Pt, Mn, Ta, W, V or Mo which may be doped with Sb or F, and may be made of a single species or more than one species. It is helpful to use a single species or more than one species of particles mixed or coated with an organic resin to attain various properties necessary for use in automobiles.

It is preferred to use fine particles of at least one of tin oxide doped with antimony (ATO) and indium oxide doped with tin (ITO) as the IR cutoff fine particles because the excellent IR cutoff properties of ATO fine particles and ITO particles makes it possible to reduce the amount of the IR cutoff fine particles in the interlayer. ITO fine particles are even more excellent than ATO fine particles in IR cutoff properties. Therefore, a smaller amount of ITO particles are required than ATO particles to obtain desired IR cutoff properties. Therefore, ITO fine particles are particularly preferable for use as the IR cutoff particles.

On the other hand, it is necessary to disperse a certain amount of IR cutoff particles in the interlayer in order to obtain desired IR cutoff properties whether the IR cutoff particles are ATO or ITO fine particles or other fine particles. Therefore, it is difficult to keep the haze of the interlayer low under conditions which guarantee desired IR cutoff properties and radio wave transmittance.

For this reason, glass sheets having the following properties are used as both the glass sheets 11a and 11b shown in the figure are. Glass sheets characterized by a UV transmittance as stipulated in ISO-9050 of at most 30%, a visible light transmittance of at least 70% under a standard light source A, a dominant wavelength of from 480 to 570 nm and an excitation purity of at most 6% at the actual thickness.

For the glass sheets having the above-mentioned characteristics, soda lime silica glass substantially having the following composition in terms of mass percentage is preferably used.

$SiO_2$: 65–75%, $Al_2O_3$: 0.1–5%, $Na_2O+K_2O$: 10–18%, CaO: 5–15%, MgO: 1–6%, $SO_3$: 0.05–2%, total iron expressed as $Fe_2O_3$: 0.3–1%, total cerium expressed as $CeO_2$ or/and $TiO_2$: 0.5–2%.

Glass sheets having the above-mentioned characteristics, especially glass sheets having the above-mentioned composition, have heat absorbing properties, and therefore can impart a certain degree of IR cutoff properties attributable to their own IR cutoff properties to the laminated glass.

Hence, the laminated glass can have satisfactory IR cutoff properties as a whole even with less amount of IR cutoff fine particles. Consequently, it is possible to lower the haze of the interlayer and improve the appearance of the laminated glass.

Thus, use of glass sheets having IR cutoff properties can reduce the amount of the IR cutoff fine particles in the interlayer. Specifically speaking, because ITO fine particles are preferable as IR cutoff particles as mentioned above, the amount of the ITO fine particles dispersed in the interlayer is preferably as follows: from 0.1 to 0.5 part by mass in relation to 100 parts by mass of the entire interlayer. Thus, it is possible to keep the haze of the laminated glass at most 1% and impart satisfactory overall IR cutoff properties to the laminated glass.

In addition, use of glass sheets characterized by a UV transmittance as stipulated in ISO-9050 of at most 15%, a visible light transmittance of at least 70% under a standard light source A, a dominant wavelength of from 480 to 570 nm and an excitation purity of at most 6% as stipulated by ISO-9050 at the actual thickness produces the following effects. Namely, use of the above-mentioned glass sheets makes it possible to provide a laminated glass having UV shielding properties while lowering the haze attributable to the IR cutoff particles. Therefore, the laminated glass of the present invention using the above-mentioned glass sheets can attain both the functional properties, IR cutoff properties and shielding properties.

In the present invention, the UV transmittance of a glass sheet is expressed as that measured at the actual thickness of the glass sheet. The glass sheets in the present invention are characterized in that the UV transmittance as stipulated in ISO-9050 is at most 30%, preferably at most 15%, at the actual thickness.

In the present invention, the visible light transmittance of a glass sheet is expressed as that measured under a standard light source A at the actual thickness of the glass sheet. The glass sheets in the present invention are characterized in that the visible light transmittance measured in accordance with the visible light transmittance test stipulated in JIS R3212-1992 is at least 70%.

The glass sheets in the present invention are characterized in that the dominant wavelength measured in accordance with the method of measuring a dominant wavelength stipulated in JIS Z8701-1982 is from 480 to 570 nm, preferably from 500 to 540 nm.

In the present invention, the excitation purity of a glass sheet is expressed as that measured at the actual thickness. The glass sheets in the present invention are characterized in that the excitation purity measured in accordance of the method of measuring an excitation purity stipulated in JIS Z8701-1982 under a standard light source A is at most 6%, preferably from 2 to 6%.

In the present invention, the thickness of each glass sheet is preferably from 1.2 to 5 mm. The thickness of the plural glass sheets may be the same or different. When the plural glass sheets have the same thickness, the thickness is preferably from 1.7 to 3 mm. When the plural glass sheets have different thickness, it is preferred that the thinner glass sheet has a thickness of from 1.2 to 2.5 mm, and the thicker one has a thickness of from 2 to 3 mm.

In the illustrated embodiment, the laminated glass comprises two glass sheets and an interlayer interposed between them. The laminated glass of the present invention may comprise more than two glass sheets and interlayers interposed therebetween. In this case, at least one of the plural interlayers should be an interlayer having IR cutoff fine particles dispersed therein.

The laminated glass of the present invention is characterized in that at least one of the glass sheets is characterized by a UV transmittance as stipulated in ISO-9050 of at most 30%, a visible light transmittance of at least 70% under a standard light source A, a dominant wavelength of from 480 to 570 nm and an excitation purity of at most 6% at the actual thickness. In the above-mentioned embodiment, the two glass sheets both have the above-mentioned characteristics. In the case of a laminated glass comprising two glass sheets like the illustrated embodiment, it is preferred that both the glass sheets have the above-mentioned characteristics in view of the matching of the glass sheets in shape.

The laminated glass of the present invention is suitable for windowpanes of automobiles. As windowpanes of automobiles, glass sheets having the functions of radio, TV and CPS antennas are often used. Besides, most automobiles these days are equipped with various functional systems such as the electric road pricing system and the keyless entry system which send out or receive radio waves through windowpanes. Therefore, glass sheets which transmit radio waves are required as windowpanes for automobiles.

The laminated glass of the present invention has IR cutoff properties even without using a glass sheet having a thin metal or metal oxide film. Because the sheet resistance of the laminated glass, especially of the glass sheets, is large for this reason, the laminated glass can transmit radio wave transmission. Therefore, the laminated glass of the present invention is suitable for windowpanes of automobiles. The sheet resistances of the glass sheets in the present invention are preferably at least 20 kΩ/□, in particular at least 10 MΩ/□.

The interlayer in the present invention is obtainable by the method described below. Firstly, IR cutoff fine particles having particle diameters less than 0.2 μm are dispersed in a plasticizer used for the interlayer. Then, the plasticizer having the IR cutoff fine particles dispersed therein is added to a resin solution for the interlayer and kneaded to obtain a raw resin for film. Then, the raw resin is molded, for example, by extrusion into film to obtain an interlayer having IR cutoff fine particles dispersed therein.

At the time of addition of the plasticizer, various additives may be added to the resin solution for the interlayer. As the additives, various pigments, organic UV absorbers and organic heat absorbers may be mentioned. As the plasticizer and the solvent in the resin solution for the interlayer, already known ones may be used.

Now, specific Examples of the present invention will be explained.

LAYER EXAMPLE 1

10 g of 3GH (triethylene glycol-di-2-ethyl butyrate) containing ITO fine particles (particle diameters of at most 0.02 μm) dispersed therein (the amount of the ITO fine particles was 1 g), 130 g of ordinary 3GH and 360 g of PVB (polyvinylbutyral) resin were obtained. The 3GH was added to the PVB resin and kneading and mixing was done with a three-roll mixer at about 70° C for about 15 minutes. The resulting raw resin for film was molded at about 190° C with an extruder into film having a thickness of about 0.8 mm and wound up on a roll to obtain an interlayer designated as Layer Example 1.

LAYER EXAMPLE 2

The same procedure as in Layer Example 1 was followed except that the amount of the ITO fine particles in 10 g of the 3GH (triethylene glycol-di-2-ethyl butyrate) containing ITO fine particles (particle diameters of at most 0.02 μm) dispersed therein was changed from 1 g to 2.5 g to obtain an interlayer designated as Layer Example 2.

GLASS EXAMPLES

Three kinds of glass sheets of 1000×1500 (mm) in size and 2 mm in thickness were obtained. The three kinds of glass sheets are as follows.

GLASS EXAMPLE 1

Glass sheets made of ordinary colorless soda lime silica glass.

GLASS EXAMPLE 2

Glass sheets made of green soda lime silica glass.

GLASS EXAMPLE 3

Soda lime silica glass substantially having the following composition in terms of mass percentage which is favorable as sheet glass characterized by a UV transmittance as stipulated in ISO-9050 of at most 30%, a visible light transmittance of at least 70% under a standard light source A, a dominant wavelength of from 480 to 570 nm and an excitation purity of at most 6% at 2.00 mm thickness.

$SiO_2$: 71%, $Al_2O_3$: 1.7%, $Na_2O+K_2O$: 12.8%, CaO: 8%, MgO: 3.5%, $SO_3$: 0,2%, total iron expressed as $Fe_2O_3$: 0.62%, total cerium expressed as $CeO_2$: 1.55%, $TiO_2$: 0.35%.

Then, each two glass sheets selected from Glass Examples 1 to 3 were bonded by using an interlayer designated as Layer Example 1 or 2 to obtain laminated glasses having the following structures (Laminate Examples 1 to 6).

LAMINATE EXAMPLE 1

Glass Example 3/Layer Example 1/Glass Example 1

LAMINATE EXAMPLE 2

Glass Example 3/Layer Example 1/Glass Example 2

LAMINATE EXAMPLE 3

Glass Example 1/Layer Example 1/Glass Example 1

LAMINATE EXAMPLE 4

Glass Example 3/Layer Example 2/Glass Example 1

LAMINATE EXAMPLE 5

Glass Example 3/Layer Example 2/Glass Example 2

LAMINATE EXAMPLE 6

Glass Example 1/Layer Example 2/Glass Example 1

The transmittances at wavelengths between 300 and 2100 nm of the resulting laminated glasses designated as Laminate Examples 1 to 6 were measured to obtain the visible light transmittances $T_v$ (%) and the solar transmittances $T_e$ (%) as stipulated in JIS R3106. The hazes (%) of the laminated glasses were measured in accordance with JIS K6714.

Figure 2A:
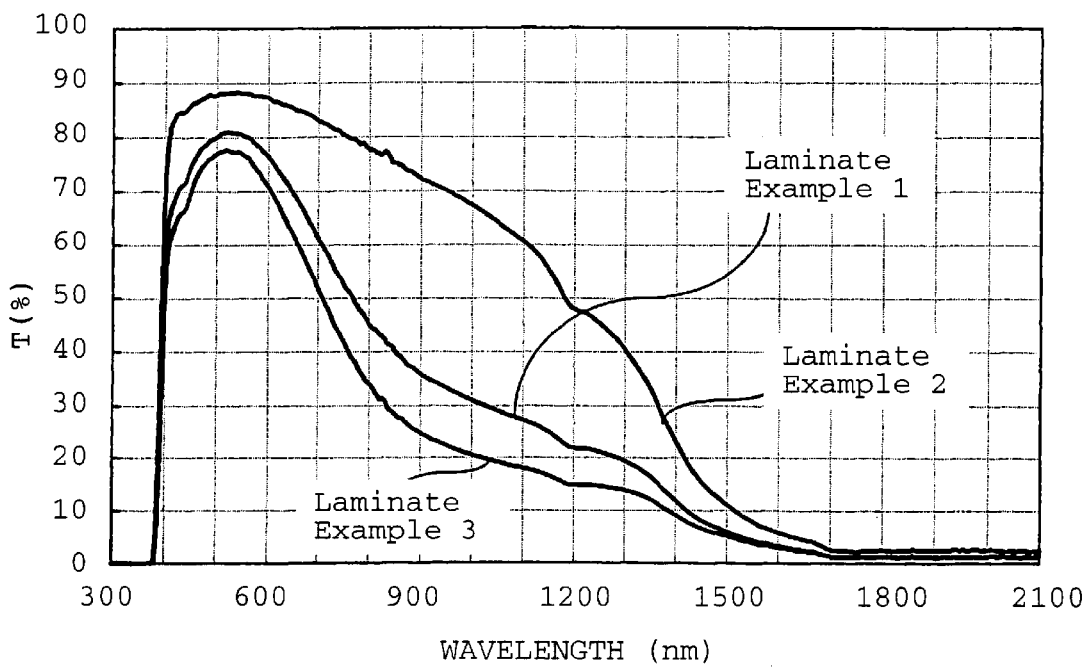
FIG. 2 is a graph showing the spectral transmittances of laminated glasses.
Figure 2B:
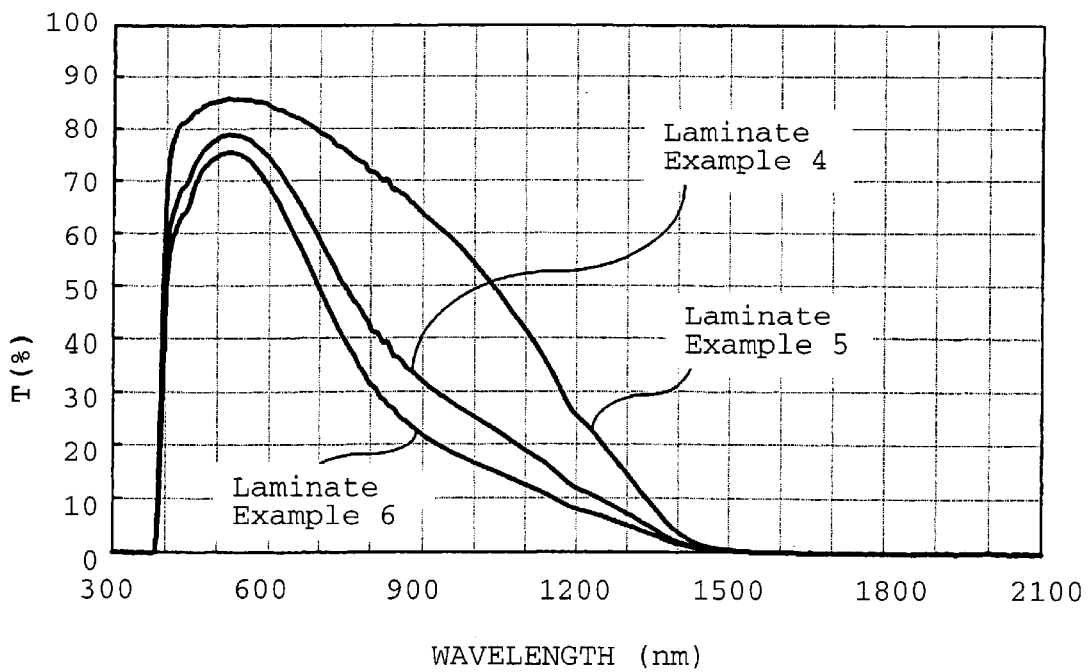

The results are shown in the following table and FIG. 2 showing spectral transmittances of laminated glasses, Laminate Examples 1 to 3; FIG. 2(a), Laminate Examples 4 to 6; FIG. 2(b), the ordinate; transmittance (%), the abscissa; wavelength (nm)).

| Laminate Example | $T_v$ | $T_e$ | Haze |
|---|---|---|---|
| 1 | 77.9 | 47.8 | 0.3 |
| 2 | 73.2 | 41.0 | 0.3 |
| 3 | 87.5 | 67.4 | 0.2 |
| 4 | 75.7 | 43.9 | 0.5 |
| 5 | 71.0 | 37.8 | 0.6 |
| 6 | 84.9 | 60.0 | 0.4 |

The results in the above table indicate that the use glass sheets of Glass Example 3 (in Laminate Examples (1, 2, 4 and 5) made it possible to obtain laminated having desired IR cutoff properties with small amounts of ITO fine particles. The IR cutoff properties are expressed as the solar transmittance $T_e$ Laminate Examples 1, 2, 4 and 5 in which glass sheets and interlayers were so selected that the $T_e$ would be from 30 to 50% are favorable examples of the laminated glass of the present invention.

INDUSTRIAL APPLICABILITY

According to the present invention, by the use of the interlayer containing IR cutoff fine particles with particle diameters of at most 2 μm dispersed therein, it is possible to a laminated glass having IR cutoff properties. The use of glass sheets characterized by a UV transmittance as stipulated in ISO-9050 of at most 30%, a visible light transmittance of at least 70% under a standard light source A, a dominant wavelength of from 480 to 570 nm and an excitation purity of at most 6% at the actual thickness to prevent an unfavorable appearance resulting from the IR cutoff fine particles dispersed therein makes it possible to provide a laminated glass having IR cutoff properties with no unfavorable sacrifice of the appearance.

Further, by virtue of the use of such glass sheets as described above, it is possible to obtain a laminated glass having both IR cutoff properties and UV shielding properties easily.

What is claimed is:

1. A laminated glass comprising plural glass sheets and an interlayer interposed between the plural glass sheets, wherein the interlayer has heat shielding fine particles with particle diameters of at most 0.2 μm dispersed therein, and at least one of the plural glass sheets is characterized by a UV transmittance as stipulated in ISO-9050 of at most 30%, a visible light transmittance of at least 70% under a standard light source A, a dominant wavelength of from 480 to 570 nm and an excitation purity of at most 6% at 2.00 mm thickness, and wherein said laminated glass has a haze of at most 1.0% in accordance with JIS K6714, a solar transmittance $T_e$ of from 30 to 50% as stipulated in JIS R3106, and a visible light transmittance $T_v$ of at least 71%.

2. The laminated glass according to claim 1, wherein the interlayer is a polyvinylbutyral film.

3. The laminated glass according to claim 1, wherein the heat shielding fine particles have particle diameters of from 0.001 to 0.15 μm.

4. The laminated glass according to claim 1, wherein the heat shielding fine particles contain fine particles made of a metal, an oxide, a nitride or a sulfide of Sn, Ti, Si, Zn, Zr, Fe, Al, Cr, Co, In, Ni, Ag, Cu, Pt, Mn, Ta, W, V or Mo which may be doped with Sb or F.

5. The laminated glass according to claim 1, wherein the heat shielding fine particles are fine particles of tin oxide doped with antimony.

6. The laminated glass according to claim 1, wherein the heat shielding fine particles are fine particles of indium oxide doped with tin.

7. The laminated glass according to claim 6, wherein the amount of the particles of indium oxide doped with tin dispersed in the interlayer is from 0.1 to 0.5 parts by weight in relation to 100 parts by weight of the entire interlayer.

8. The laminated glass according to claim 1, which is a windowpane for automobiles.

9. The laminated glass according to claim 1, wherein said at least one of the plural glass sheets has the following composition in terms of mass percentage:

$SiO_2$: 65–75%, $Al_2O_3$: 0.1–5%, $Na_2O+K_2O$: 10–18%, CaO: 5–15%, MgO: 1–6%, $SO_3$: 0.05–2%, total iron expressed as $Fe_2O_3$: 0.3–1%, total cerium expressed as $CeO_2$ and/or $TiO_2$: 0.5–2%.

10. The laminated glass according to claim 9, wherein each glass sheet has a thickness of from 1.2 to 5 mm.

11. The laminated glass according to claim 10, wherein each glass sheet has a thickness of from 1.7 to 3 mm.

12. The laminated glass according to claim 9, wherein the plural glass sheets have different thicknesses, one of from 1.2 to 2.5 mm and another one of from 2 to 3 mm.

13. The laminated glass according to claim 1, wherein each glass sheet has a thickness of from 1.2 to 5 mm.

14. The laminated glass according to claim 13, wherein each glass sheet has a thickness of from 1.7 to 3 mm.

15. The laminated glass according to claim 1, wherein the UV transmittance as stipulated in ISO-9050 is at most 15%.

16. The laminated glass according to claim 1, wherein the plural glass sheets have different thicknesses, one of from 1.2 to 2.5 mm and another one of from 2 to 3 mm.

17. The laminated glass according to claim 1, which has a haze of at most 0.3% in accordance with JIS K6714.

* * * * *